United States Patent
Davis, Jr. et al.

(10) Patent No.: US 6,688,640 B1
(45) Date of Patent: Feb. 10, 2004

(54) TETHERED AIR BAG COVER

(75) Inventors: Joseph J. Davis, Jr., Ortonville, MI (US); John J. H. Faarup, Sr., Troy, MI (US)

(73) Assignee: Lear Corporation, Southfield, MI (US)

( * ) Notice: Subject to any disclaimer, the term of this patent is extended or adjusted under 35 U.S.C. 154(b) by 219 days.

(21) Appl. No.: 09/511,741

(22) Filed: Feb. 24, 2000

Related U.S. Application Data

(60) Provisional application No. 60/149,323, filed on Aug. 17, 1999.

(51) Int. Cl.$^7$ ................................................ B60R 21/20
(52) U.S. Cl. ................ 280/728.3; 280/732; 280/731
(58) Field of Search ............................. 280/728.3, 732, 280/730.2, 731, 743.1

(56) References Cited

U.S. PATENT DOCUMENTS

| | | | | |
|---|---|---|---|---|
| 5,651,562 A | * | 7/1997 | Hagen et al. | 280/728.3 |
| 5,765,862 A | * | 6/1998 | Bently | 280/728.3 |
| 5,765,867 A | * | 6/1998 | French | 280/743.2 |
| 5,975,563 A | * | 11/1999 | Gallagher et al. | 280/728.3 |
| 5,979,929 A | * | 11/1999 | Stanger et al. | 280/728.2 |
| 6,189,916 B1 | * | 2/2001 | Bowers et al. | 280/728.3 |

* cited by examiner

Primary Examiner—Robert P. Olszewski
Assistant Examiner—Christopher Buchanan
(74) Attorney, Agent, or Firm—Bill C. Panagos

(57) ABSTRACT

A vehicle instrument panel assembly includes a substrate having a recess formed therein with a deployable air bag assembly positioned within the recess. The air bag assembly is attached to the substrate by an attachment bolt. An air bag cover is secured to the substrate by a snap-in attachment feature to enclose the air bag assembly within the recess. The air bag cover includes an integrally molded tether which is connected to the attachment bolt such that deployment of the air bag assembly causes detachment of the snap-in attachment feature to allow air bag deployment outside the recess while the tether maintains its connection with the attachment bolt.

8 Claims, 1 Drawing Sheet

TETHERED AIR BAG COVER

CROSS-REFERENCE TO RELATED APPLICATION

This application claims priority to U.S. provisional application Ser. No. 60/149,323, filed Aug. 17, 1999.

TECHNICAL FIELD

The present invention relates to a seamless air bag cover with a snap-in attachment feature for attachment to an instrument panel substrate and a tether connecting the air bag cover to the substrate such that deployment of the air bag disengages the snap-in attachment feature while the tether maintains its attachment to the substrate.

BACKGROUND ART

Typically, vehicle instrument panel air bags are deployed through a tear seam formed in an injection molded component, such as an air bag door. The tear seam in the air bag door is typically a thinned-down section which is formed in the door in the injection molding process. However, the molding of this thinned-down section may result in discoloration or loss of strength, which can lead to scrap problems. Also, the thinned-down section may be visible on the exposed surface of the component, which is aesthetically undesirable. This thinned-down section may even be visible after the surface has been painted.

It has been contemplated to provide a tear seam at a hidden location on the air bag door, however this may create air bag deployment problems and design problems associated with concealing the tear seam on the instrument panel. When concealing such tear seams, a secondary design result may be the necessity to control gaps between the air bag door and adjacent components to eliminate squeaks. This, of course, is undesirable.

Accordingly, it is desirable to provide an improved air bag door design which eliminates the tear seam and allows snap-in attachment of the air bag door for ease of assembly.

DISCLOSURE OF INVENTION

The present invention provides an air bag cover with a snap-in attachment feature for attachment to a substrate, and a tether which connects the air bag cover to the substrate. When the air bag is deployed, the snap-in attachment feature is disengaged, and the air bag cover opens to allow air bag deployment while the tether secures the air bag cover to the substrate.

More specifically, the present invention provides a vehicle instrument panel assembly including a substrate having a recess formed therein with a deployable air bag assembly positioned within the recess. The air bag assembly is attached to the substrate by an attachment bolt. An air bag cover is secured to the substrate by a snap-in attachment feature to enclose the air bag assembly within the recess. The air bag cover includes an integrally molded tether which is connected to the attachment bolt such that deployment of the air bag assembly causes detachment of the snap-in attachment feature to allow air bag deployment outside the recess while the tether maintains its connection to the attachment bolt.

Accordingly, an object of the invention is to provide a seamless air bag cover which allows air bag deployment by other means.

Another object of the invention is to provide an air bag cover with a snap-in attachment feature and a tether securing the air bag cover to a substrate such that deployment of the air bag disengages the snap-in attachment feature to open the air bag cover while the tether secures the cover to the substrate.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
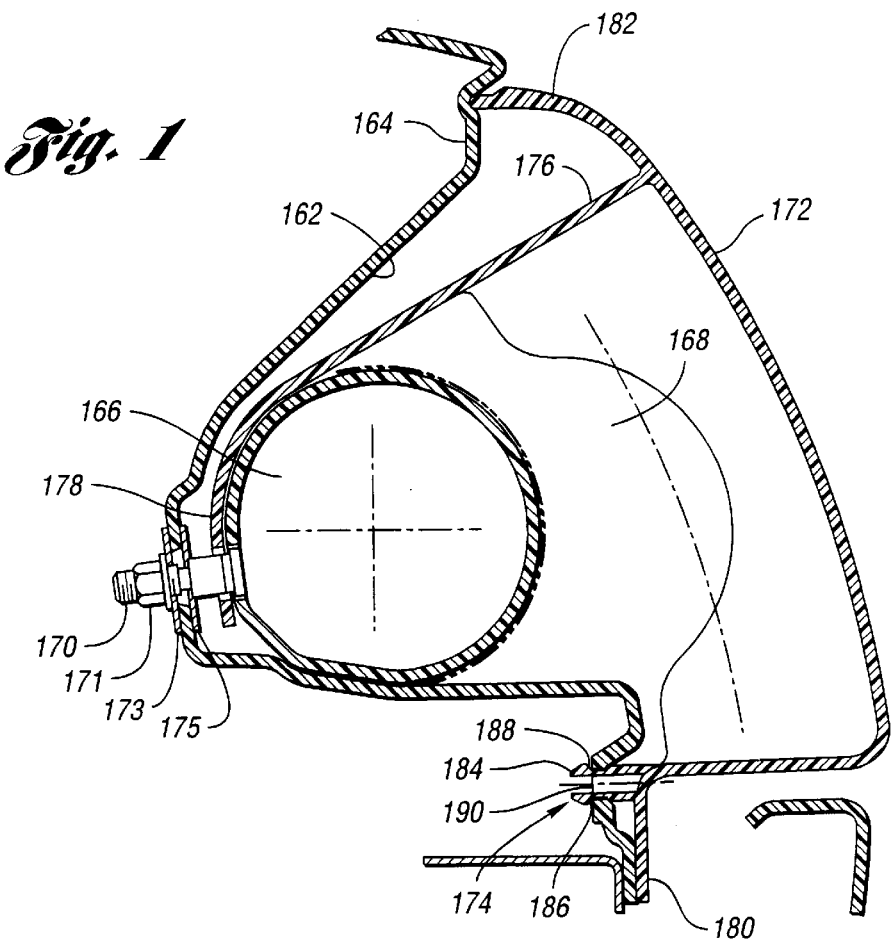
FIG. 1 shows a vertical cross-sectional view of an instrument panel substrate including an air bag assembly and seamless, tethered air bag cover in accordance with the present invention.
Figure 2:
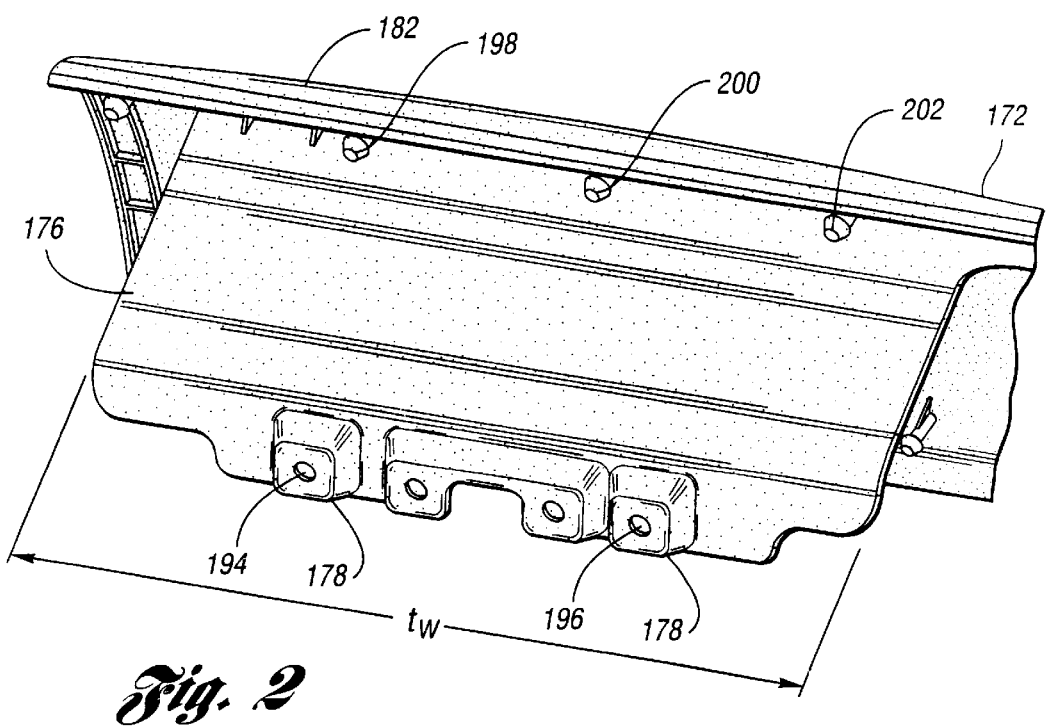
FIG. 2 shows a rear perspective view of an air bag cover and tether in accordance with the present invention.

The present invention as shown in FIGS. 1 and 2 eliminates the problems addressed above with respect to the tear seam while providing a snap-in attachment feature.

As shown, an air bag can or recess 162 is formed in an instrument panel substrate 164. An inflator 166 and air bag 168 are mounted within the recess 162 by a bolt 170. The bolt 170 is secured by a nut 171 and attachment plates 173, 175.

An injection molded air bag cover 172 encloses the air bag 168 within the recess 162 by snap attachments 174 which are positioned around the periphery of the cover 172.

The cover 172 includes an integrally molded tether 176 with an end 178 which is attached to the bolt 170.

When the air bag 168 deploys, the snap-in attachment feature 174 at the bottom of the cover 172 disengages, and the cover 172 opens upwardly to allow air bag deployment, while the tether 176 maintains its attachment to the bolt 170. Preferably, the air bag cover 172 and tether 176 are made of a soft injection molded plastic, such as a "DYM", which is a thermoplastic polyester elastomer available from Dupont Corp. of Wilmington, Del., to allow the air bag cover 172 to bend and displace upwardly for air bag deployment.

As shown, the snap-in attachment features 174 which are detached during air bag deployment are positioned near a lower edge 180 of the air bag cover 172 and the tether 176 is positioned near an upper edge 182 of the air bag cover 172. In this configuration, only the snap-in features 174 along the lower edge 180 of the air bag cover 172 are detached during air bag deployment so that the air bag cover 172 flips open upwardly for air bag deployment.

The snap-in attachment features 174 each comprise a plug 184 having chamfered edges 186, 188 which engage with a corresponding aperture 190 formed in the substrate 164. The chamfered edges 186,188 are compressible together when a deployment force is exerted against the cover 172 by the air bag 168, which disengages the snap-in feature 174 for deployment of the air bag 168.

FIG. 2 shows a rear perspective view of the air bag cover 172 and tether 176. As shown, the tether has a tether width $t_w$ which is at least approximately 50% as wide as the air bag cover. Also, two attachment locations 194, 196 are provided on the tether 176 for receiving two attachment bolts 170 for controlled opening of the air bag cover 172 during deployment of the air bag 168. In other words, by attaching the tether 176 to the substrate at spaced locations 194, 196, the attachment features 174 along the lower edge 180 of the air bag cover 172 will detach substantially simultaneously, and the lower edge 180 of the air bag cover 172 will maintain a substantially horizontal orientation as it opens to a deployment position. Attachment features 198, 200, 202 are also provided along the upper edge 182 of the air bag cover 172. These attachment features 198, 200, 202 may or may not detach during air bag deployment. There is no need for detachment of these attachment features 198, 200, 202 if the air bag cover 172 is sufficiently flexible to allow air bag deployment without such detachment.

The end 178 of the tether 176 is loosely attached to the bolts 170 to allow a certain amount of "slop" so that the fit of the periphery of the cover 172 with respect to the instrument panel substrate 164 may be easily adjusted.

While the best mode for carrying out the invention has been described in detail, those familiar with the art to which this invention relates will recognize various alternative designs and embodiments for practicing the invention within the scope of the appended claims.

What is claimed is:

1. A vehicle instrument panel assembly comprising:
   a substrate including a recess formed therein;
   a deployable air bag assembly positioned within the recess, said air bag assembly attached to the substrate by an attachment bolt;
   an air bag cover secured to the substrate by a snap-in attachment feature to enclose the air bag assembly within the recess, the air bag cover being free from having any tear seams;
   wherein said air bag cover includes an integrally molded tether which is connected to said attachment bolt such that deployment of the air bag assembly causes detachment of the snap-in attachment feature to allow air bag deployment outside the recess while the tether maintains its connection with the attachment bolt; and
   wherein said air bag cover is injection molded, and said tether is integrally molded therewith.

2. The vehicle instrument panel assembly of claim 1, wherein said snap-in attachment feature is positioned near a lower edge of the air bag cover and said tether is positioned near an upper edge of the air bag cover.

3. The vehicle instrument panel assembly of claim 2, wherein said snap-in feature comprises a plug having chamfered edges engageable with a corresponding aperture formed in the substrate, said chamfered edges being compressible together for disengagement of the snap-in feature for deployment of the air bag assembly.

4. The vehicle instrument panel assembly of claim 1 wherein said tether comprises a tether width at least approximately 50% as wide as the air bag cover.

5. A vehicle instrument panel assembly comprising:
   a substrate including a recess formed therein;
   a deployable air bag assembly positioned within the recess,
   an air bag cover secured to the substrate by a snap-in attachment feature to enclose the air bag assembly within the recess, the air bag cover being free from having any tear seams;
   wherein said air bag cover includes an integrally molded tether which is connected to the substrate such that deployment of the air bag assembly causes detachment of the snap-in attachment feature to allow air bag deployment outside the recess while the tether maintains its connection to the substrate;
   wherein said snap-in feature comprises a plug having chamfered edges engageable with a corresponding aperture formed in the substrate, said chamfered edges facing the aperture after insertion therethrough and being compressible together for disengagement of the snap-in feature for deployment of the air bag assembly.

6. The vehicle instrument panel assembly of claim 5, wherein said air bag assembly is attached to the substrate by an attachment bolt and the tether is connected to said attachment bolt.

7. The vehicle instrument panel assembly of claim 5, wherein said snap-in attachment feature is positioned near a lower edge of the air bag cover and said tether is positioned near an upper edge of the air bag cover.

8. The vehicle instrument panel assembly of claim 5, wherein said tether comprises a tether width at least approximately 50% as wide as the air bag cover.

* * * * *